(12) United States Patent
Yagenji et al.

(10) Patent No.: US 6,525,931 B2
(45) Date of Patent: Feb. 25, 2003

(54) COVER FOR A HARD DISK DRIVE

(75) Inventors: Sumihiko Yagenji, Itabashi-ku (JP);
Takuya Funatsu, Utsunomiya (JP);
Takumi Unno, Ihara-gun (JP)

(73) Assignee: Kokoku Intech Co., Ltd., Tokyo (JP)

( * ) Notice: Subject to any disclaimer, the term of this patent is extended or adjusted under 35 U.S.C. 154(b) by 193 days.

(21) Appl. No.: 09/756,219

(22) Filed: Jan. 9, 2001

(65) Prior Publication Data

US 2001/0014009 A1 Aug. 16, 2001

(30) Foreign Application Priority Data

Feb. 15, 2000  (JP) ........................................ 2000-036290

(51) Int. Cl.$^7$ ............................ G05K 1/16; G11B 33/14
(52) U.S. Cl. ...................... 361/685; 361/679; 361/752; 174/50.5; 174/523; 181/208; 248/638; 248/632; 360/97.02; 369/75.1
(58) Field of Search ................................ 361/685, 684, 361/683, 686, 752, 737, 679; 174/66, 50, 50.5, 52.3, 50.54, 50.57; 181/207, 208, 200; 248/633, 634, 636, 638, 618; 360/137, 137 D, 97.02; 369/75.1, 76, 75.2, 77.1, 77.2, 78, 79, 80, 81, 82

(56) References Cited

U.S. PATENT DOCUMENTS 5,025,336 A * 6/1991 Morehouse et al. ..... 360/97.02
5,282,101 A * 1/1994 Reinisch ................... 360/97.02
5,546,250 A * 8/1996 Diel .......................... 360/97.02
6,078,498 A * 6/2000 Eckerd et al. ............... 361/685

FOREIGN PATENT DOCUMENTS

| JP | 11 232833 | 8/1999 |
| JP | 2000 49471 | 2/2000 |
| JP | 2000 195249 | 7/2000 |
| JP | 2000 199567 | 7/2000 |
| JP | 2000 213651 | 8/2000 |
| JP | 2000 291802 | 10/2000 |

* cited by examiner

Primary Examiner—Darren Schuberg
Assistant Examiner—Lisa Lea-Edmonds
(74) Attorney, Agent, or Firm—James Creighton Wray; Meera P. Narasimhan

(57) ABSTRACT

The purpose of the present invention is to provide a cover for a hard disk drive which can prevent the outflow of a damping resin material and the loosening of a screw fixing the cover to a storage-enclosing case. To attain this purpose, the cover of the present invention is fabricated of a laminated plate with a damping resin member closely inserted between an inner plate and an outer plate of metal, to cover a storage device case by fastening with screws at tapped holes equipped on the laminated plate, wherein a sealing member is installed on the inner plate for sealing between the laminated plate and the case; the marginal portion of the laminated plate and the inner wall of the tapped hole are formed to have a closed structure by bending the inner plate and/or the outer plate to attain a direct contact with each other, so as to prevent the damping resin material from flowing out; and the inner wall of the tapped hole of the closed structure works as a stopper for hooking the head of the screw inserted through the tapped hole.

9 Claims, 4 Drawing Sheets

COVER FOR A HARD DISK DRIVE

BACKGROUND OF THE INVENTION

1. Field of the Invention

The present invention relates to a cover for a hard disk drive case, constituting a hard disk drive by covering a case in which a storage device is enclosed.

2. Brief Description of the Prior Art

FIG. 9 is a side view of cover $C_1$ for a hard disk drive in a prior art (hereinafter to be called 'Cover'), and FIG. 10 is a plan view of Cover $C_1$ which is seen from the inner side. FIG. 11 is an enlarged cross-sectional view of FIG. 10, cut along the line A—A, and FIG. 12 is an enlarged cross-sectional view of FIG. 10 cut along the line B—B.

As shown in those figures, Cover $C_1$ in a prior art is formed out of a laminated plate $P_1$, having a damping resin material 3 closely inserted between an inner plate 1 and an outer plate 2 of stainless steel, equipped with a sealing material 4 for sealing between a storage device case (not illustrated) and laminated plate $P_1$, and a tapped hole 5 to insert a screw for screwing laminated plate $P_1$ to the case.

The above-mentioned laminated plate $P_1$ has a three-layer structure composed of inner plate 1, outer plate 2 and damping resin material 3, wherein damping resin material 3 is exposed at the peripheral cross section of laminated plate $P_1$.

Tapped hole 5 is a hole perforating laminated plate $P_1$, and damping resin material 3 is also seen exposed on the inner wall of tapped hole 5.

Sealing member 4 is formed as a circular convex ridge on the surface of inner plate 1 according to the shape of aforementioned case, equipped with a non-slip stopper 6 formed monolithically with the convex sealing member through perforating hole 1c installed on inner plate 1. Sealing member 4 is installed on inner plate 1 before laminated plate $P_1$ is fabricated.

However, the cover in the prior art has the following problems:

(1) Due to the structure wherein damping resin material 3 is exposed at the peripheral cross section of laminated plate $P_1$ and on the inner wall of tapped hole 5, a rise of the ambient temperature of a hard disk drive causes damping resin material 3 to be softened to flow outside from between inner plate 1 and outer plate 2, thereby not only damaging the appearance and the quality of the hard disk drive but also depressing the damping function of Cover $C_1$.

(2) Outflow of damping resin material 3 from the inner wall of tapped hole 5 caused by the rise of the above-mentioned ambient temperature makes laminated plate $P_1$ around tapped hole 5 thinner, as shown in FIG. 13, and a screw 7 inserted to tapped hole 5 for screwing Cover $C_1$ to above-mentioned case becomes loose, thereby weakening the fixing strength of Cover $C_1$ to the case. If the screw is re-fastened for compensation of loosening, the damping resin is pushed out to depress the damping function of Cover $C_1$ (3) Since Cover $C_1$ is fabricated of laminated plate $P_1$ formed by inserting damping resin material 3 between the flat inner plate 1 and the flat outer plate 2, it does not have enough resistance against bending and torsion, that is, enough rigidity.

SUMMARY OF THE INVENTION

The present invention has been carried out in consideration of the above-mentioned problems in prior arts, to prevent outflow of the damping resin material and loosening of the screw inserted through the tapped hole to fix a cover to the storage device case, thereby preventing the depression of the damping function and the decrease in the strength of fixing the cover to aforesaid case, which improves the rigidity of the hard disk drive cover.

To attain the above-mentioned purpose, the hard disk drive cover of the present invention is fabricated of a laminated plate with a damping resin material closely inserted between an inner plate and an outer plate of metal, for covering a case enclosing a storage device by fastening with screws inserted through the tapped holes equipped on the laminated plate, wherein the sealing member is installed on the inner plate for sealing between the laminated plate and the above-mentioned case, and the marginal portion of said laminated plate and the inner wall of the tapped hole are formed to have a closed structure by bending the inner plate and/or the outer plate to attain a direct contact with each other, so as to prevent the outflow of the damping resin material, and said inner wall of the tapped hole of the closed structure works as a stopper for hooking the head of the screw inserted through the tapped hole.

Thus, the present invention prevents outflow of the damping resin material and loosening of the screw fixing the cover to the case by the closed structure wherein the marginal portion of the laminated plate and the inner wall of the tapped hole are bent to directly contact with each other.

Moreover, said structure wherein the marginal portion of the laminated plate and the inner wall of the tapped hole are formed by bending the inner plate and/or the outer plate results in larger bending/torsional stress of the bent portions, thereby improving the rigidity of the whole cover.

DETAILED DESCRIPTION OF THE PREFERRED EMBODIMENTS

Hereinafter detailed embodiments according to the present invention are explained.

A hard disk drive cover $C_2$ in the embodiments is different from Cover $C_1$ of prior arts shown in FIG. 9 through FIG. 12, in the structure of the marginal portion and the inner wall of the tapped hole.

Therefore, in the embodiments, only portions of different structure of Cover $C_2$ from those of Cover $C_1$ in prior arts are illustrated, and the same portions as those in Cover $C_1$ or portions corresponding to those in $C_1$ are represented with same signs.

FIG. 1 through FIG. 5 show cross-sectional structures of marginal portion $E_1$ of hard disk drive cover $C_2$ in the embodiments.

Figure 1:
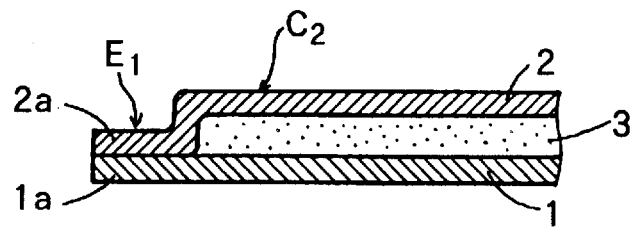
FIG. 1 is a cross-sectional view of a marginal portion of a cover for a hard disk drive in the first embodiment.

A marginal portion $E_1$ of FIG. 1 is an embodiment wherein a marginal portion 2a, formed by one inward bending and one outward bending of the marginal portion of an outer plate 2 at approximately right angles respectively, is overlapped with a marginal portion 1a of an inner plate 1 so as to attain a direct contact with each other.

Figure 2:
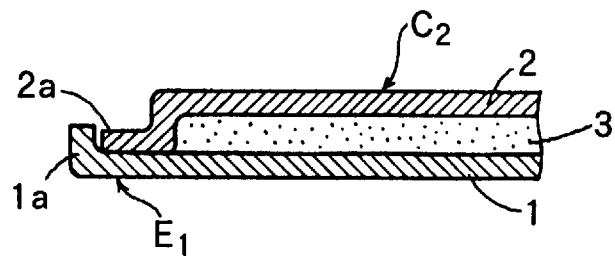
FIG. 2 is a cross-sectional view of a marginal portion of a cover for a hard disk drive in the $2^{nd}$ embodiment.

Marginal portion $E_1$ of FIG. 2 is an embodiment wherein marginal portion 2a, formed by one inward bending and one outward bending of the marginal portion of outer plate 2 at approximately right angles respectively, overlaps with marginal portion 1a of inner plate 1, and then by one outward bending of marginal portion 1a so that the inner peripheral surface of 1a of inner plate 1 meets the outer peripheral cross sectional periphery of the end of outer plate 2.

Figure 3:
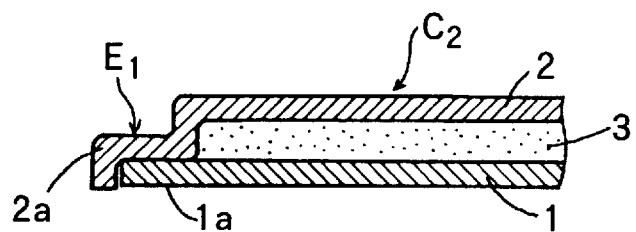
FIG. 3 is a cross-sectional view of a marginal portion of a cover for a hard disk drive in the $3^{rd}$ embodiment.

Marginal portion $E_1$ of FIG. 3 is an embodiment wherein marginal portion 2a, formed by one inward bending, one outward bending and another inward bending of the marginal portion of outer plate 2 at approximately right angles respectively, overlaps with marginal portion 1a of inner plate 1 so that the inner peripheral surface of the patch formed by the last bending of 2a meets the outer peripheral cross section of the end of inner plate 1.

Figure 4:
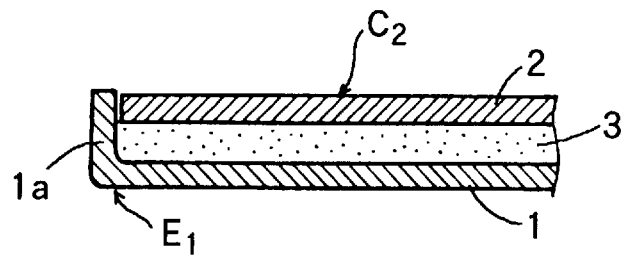
FIG. 4 is a cross-sectional view of a marginal portion of a cover for a hard disk drive in the $4^{th}$ embodiment.

Marginal portion $E_1$ of FIG. 4 is an embodiment wherein the inner peripheral surface of marginal portion 1a, formed by one outward bending of the marginal portion of inner plate 1 at an approximately right angle, meets the outer peripheral cross section of the end of outer plate 2.

Figure 5:
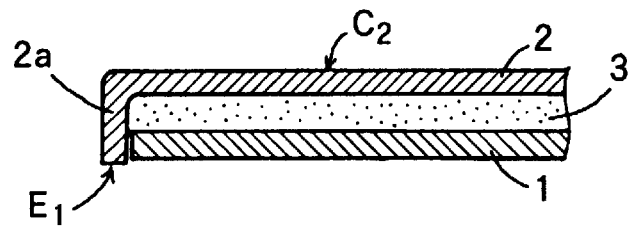
FIG. 5 is a cross-sectional view of a marginal portion of a cover for a hard disk drive in the $5^{th}$ embodiment.

Marginal portion $E_1$ of FIG. 5 is an embodiment wherein the inner peripheral surface of marginal portion 2a, formed by one inward bending of the marginal portion of outer plate 2 at an approximately right angle, meets the outer peripheral cross section of the end of inner plate 1.

Figure 6:
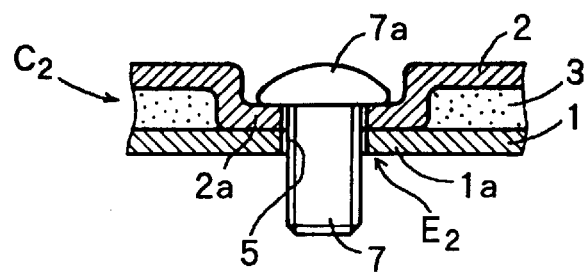
FIG. 6 is the first example of a cross-sectional view of an inner wall of a tapped hole of a cover for a hard disk drive in the embodiments.
Figure 7:
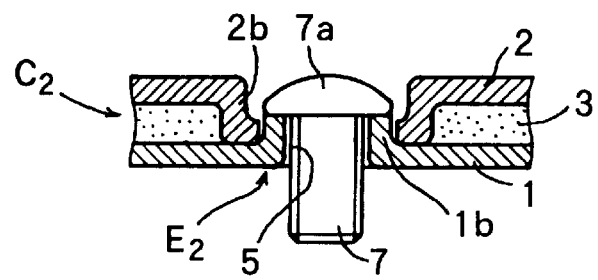
FIG. 7 is the $2^{nd}$ example of a cross-sectional view of an inner wall of a tapped hole of a cover for a hard disk drive in the embodiments.
Figure 8:
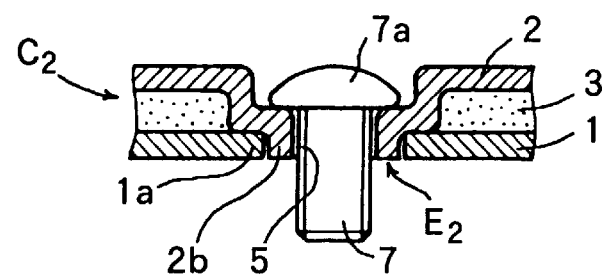
FIG. 8 is the $3^{rd}$ example of a cross-sectional view of an inner wall of a tapped hole of a cover for a hard disk drive in the embodiments.
Figure 9:
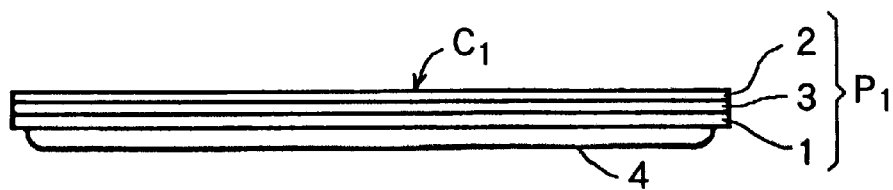
FIG. 9 shows a side view of a cover for a hard disk drive in a prior art.
Figure 10:
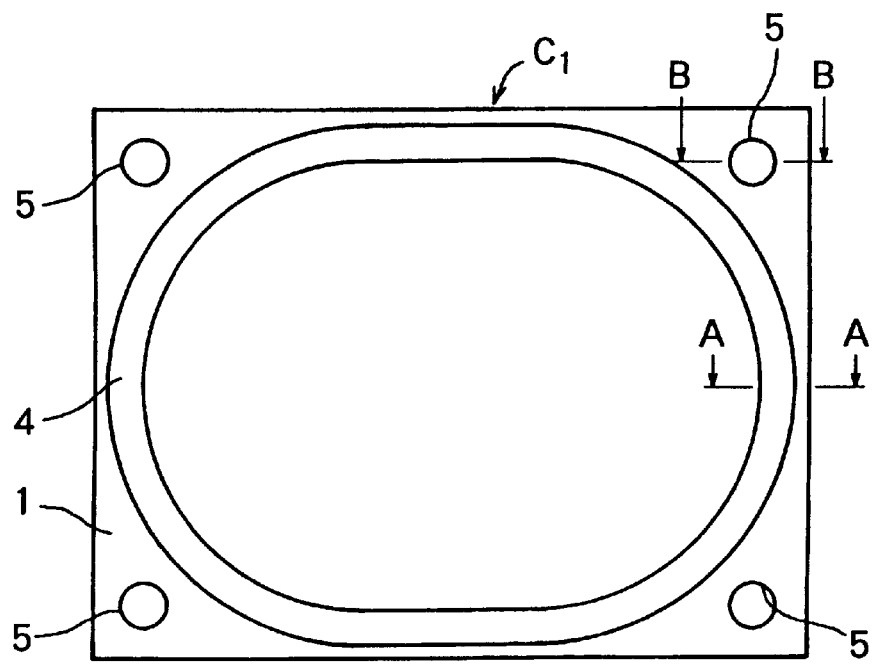
FIG. 10 is a plan view of FIG. 9.
Figure 11:
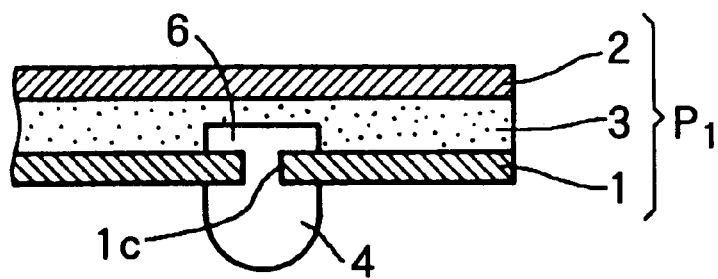
FIG. 11 is an enlarged cross-sectional view of FIG. 10 cut along the line A—A.
Figure 12:
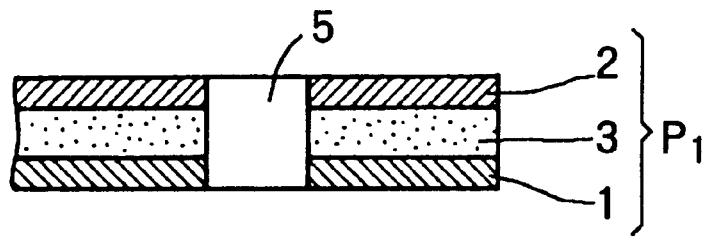
FIG. 12 is an enlarged cross-sectional view of FIG. 10 cut along the line B—B.
Figure 13:
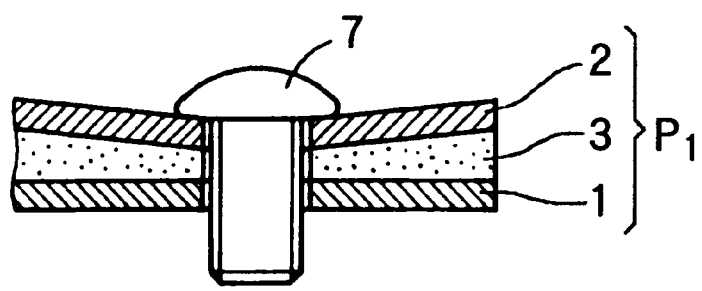
FIG. 13 is a cross-sectional view showing the screwing structure of a cover for a hard disk drive in a prior art.

FIGS. 6 through 8 show cross-sectional structures of inner wall $E_2$ of a tapped hole 5 installed on hard disk drive cover $C_2$ in the embodiment.

Inner wall $E_2$ of FIG. 6 is an embodiment wherein marginal portion 2a, formed by one inward bending and one outward bending of the peripheral margin of outer plate 2 of tapped hole 5 at approximately right angles respectively, is overlapped with peripheral margin 1a of inner plate 1 of tapped hole 5 so as to directly contact with each other. In this embodiment, a head 7a of a screw 7 is stopped by hooking on the portion where inner plate 1 overlaps with outer plate 2.

Inner wall $E_2$ of FIG. 7 is an embodiment wherein the inner peripheral surface of a tubular portion 2b, formed by one inward bending and one outward bending of the peripheral margin of outer plate 2 of tapped hole 5 at approximately right angles respectively, meets the outer peripheral surface of a tubular portion 1b formed by one inward bending of the peripheral margin of inner plate 1 of tapped hole 5 at an approximately right angle.

Inner wall $E_2$ of FIG. 8 is an embodiment wherein the outer peripheral surface of tubular portion 2b, formed by one inward bending, one outward bending and another inward bending of the peripheral margin of outer plate 2 of tapped hole 5 at approximately right angles respectively, meets the inner surface of peripheral margin 1a of inner plate 1 of tapped hole 5.

In the aforesaid examples of the cover, marginal portion $E_1$ of cover $C_2$ and inner wall $E_2$ of tapped hole 5 may be various as mentioned above, but the combinations may be optional.

As stated above, in the embodiments, marginal portion $E_1$ of cover $C_2$ and inner wall $E_2$ of tapped hole 5 are respectively formed as closed structures by bending inner plate 1 and/or outer plate 2 so as to attain direct contacts with each other.

Due to those structures, even if the damping resin is softened by the higher ambient temperature of a hard disk drive, the resin does not flow out from the periphery of cover $C_2$ or from tapped hole 5.

Additionally, since inner wall $E_2$ of tapped hole 5 has a closed structure without any damping resin material 3 at the closed portion, head 7a of screw 7 is stopped by hooking on that portion, so that the loosening of the screw is prevented even if damping resin material 3 between plates 1 and 2 is softened.

Further, the structure wherein marginal portion $E_1$ of the laminated plate and inner wall $E_2$ of the tapped hole are formed by bending inner plate 1 and/or outer plate 2 results in increasing the bending and torsional stress at this part, thereby the rigidity of the whole cover $C_2$ is improved.

In conclusion, the effects to be brought about by the above-mentioned structure of the cover of the present invention are summarized as follows:

(1) Outflow of the damping resin material composing the cover is prevented, thereby keeping away the depression of the damping function of the resin to be caused by said outflow.

(2) Loosening of the screw fixing the cover to the storage-enclosing case is prevented, which results in maintaining the fixing strength of the cover to the case.

(3) The rigidity of the cover is improved.

What is claimed is:

1. A cover for a hard disk drive fabricated of a laminated plate with a damping resin material closely inserted between an inner plate and an outer plate of metal, to cover a case enclosing a storage device by fastening with screws inserted through tapped holes equipped on the laminated plate, wherein:

a sealing member is installed on the inner plate for sealing between the laminated plate and the case;

the marginal portion of said laminated plate and the inner wall of the tapped hole are formed to have closed structures respectively by bending the inner plate and/or the outer plate to attain a direct contact with each other, so as to prevent the damping resin material from flowing out; and the inner wall of the tapped hole of the closed structure works as a stopper for hooking the head of the screw inserted through the tapped hole.

2. A cover for a hard disk drive fabricated of a laminated plate with a marginal portion according to claim 1, wherein the marginal portion of an outer plate, formed by one inward bending and one outward bending at approximately right angles respectively, is overlapped with the marginal portion of an inner plate to attain a directly contact with each other.

3. A cover for a hard disk drive fabricated of a laminated plate with a marginal portion according to claim 1, wherein the marginal portion of an outer plate, formed by one inward bending and one outward bending at approximately right angles respectively, overlaps with the marginal portion of an inner plate, and then by one outward bending of the marginal portion of the inner plate, the inner peripheral surface of the bent marginal portion of the inner plate meets the outer peripheral cross section of the end of the outer plate.

4. A cover for a hard disk drive fabricated of a laminated plate with a peripheral margin according to claim 1, wherein the marginal portion of an outer plate, formed by one inward bending, one outward bending and another inward bending at approximately right angles respectively, overlaps with the marginal portion of an inner plate so that the inner peripheral surface of the patch formed by the last bending of the marginal portion of the outer plate meets the outer peripheral cross section of the end of the inner plate.

5. A cover for a hard disk drive fabricated of a laminated plate with a peripheral margin according to claim 1, wherein the inner peripheral surface of the marginal portion of an inner plate, formed by one outward bending of the marginal portion of the inner plate at an approximately right angle, meets the outer peripheral cross section of the end of an outer plate.

6. A cover for a hard disk drive fabricated of a laminated plate with a peripheral margin according to claim 1, wherein the inner peripheral surface of the marginal portion of an outer plate, formed by one inward bending of the marginal portion of the outer plate at an approximately right angle, meets the outer peripheral cross section of the end of an inner plate.

7. A cover for a hard disk drive having an inner wall of a tapped hole equipped on the cover according to claim 1, wherein the peripheral margin of a tapped hole of an outer plate, formed by one inward bending and one outward bending at approximately right angles respectively, overlaps with the peripheral margin of an inner plate of the tapped hole so as to directly contact with each other.

8. A cover for a hard disk drive having an inner wall of a tapped hole equipped on the hard disk drive cover according to claim 1, wherein the inner peripheral surface of a tubular portion of an outer plate, formed by one inward bending and one outward bending of the peripheral margin of the outer plate of the tapped hole at approximately right angles respectively, meets the outer peripheral surface of a tubular portion of an inner plate, formed by one inward bending of the peripheral margin of an inner plate of the tapped hole at an approximately right angle.

9. A cover for a hard disk drive having an inner wall of a tapped hole equipped on the cover according to claim 1, wherein the outer peripheral surface of a tubular portion of an outer plate, formed by one inward bending, one outward bending and another inward bending of the peripheral margin of an outer plate of the tapped hole at approximately right angles respectively, meets the inner surface of the peripheral margin of an inner plate of the tapped hole.

* * * * *